Sept. 11, 1951 — A. CUNY — 2,567,636
GENERATING SET
Filed Dec. 29, 1948 — 2 Sheets-Sheet 1

INVENTOR.
André Cuny
BY

Sept. 11, 1951  A. CUNY  2,567,636
GENERATING SET

Filed Dec. 29, 1948  2 Sheets-Sheet 2

INVENTOR.
Andre Cuny
BY

Patented Sept. 11, 1951

2,567,636

UNITED STATES PATENT OFFICE 2,567,636

GENERATING SET

André Cuny, Courbevoie, France

Application December 29, 1948, Serial No. 67,911
In France December 30, 1947

14 Claims. (Cl. 290—4)

The present invention relates to electric generating sets provided with a fly-wheel.

In all the arrangements of this kind which have been suggested heretofore, the fly-wheel acts directly on the parts of a heat engine. This direct action involves very serious drawbacks, more particularly, a danger of breaking of the crank-shaft, the connecting rods, transmission and coupling members.

It is an object of the present invention to avoid these drawbacks.

The present invention consists in an electric generating set, comprising in combination, electric mains connected to a current supply, an electric machine having a first shaft, the electric machine being connected to the electric mains and being adapted to operate as a generator for supplying current into the electric mains upon a failure of the current supply to the electric mains, a flywheel connected to the first shaft and adapted to drive the first shaft when the machine operates as a generator, a stand-by engine having a second shaft, and means for connecting the second shaft and the fly-wheel when the second shaft and the fly-wheel rotate at substantially equal speeds.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
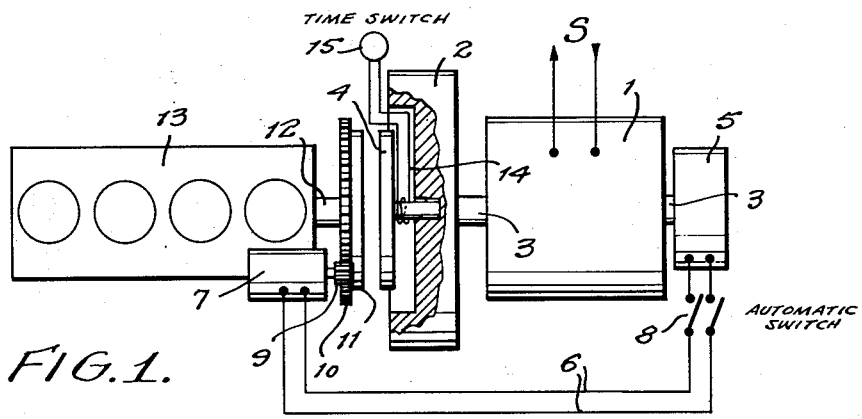
Fig. 1 is a plan view of a first embodiment of the present invention.

Referring now to the drawings, and first to Fig. 1, an electrical machine 1 fed by an electric supply S is provided with a high-inertia fly-wheel 2 fixed on the shaft 3 (termed hereinafter the first shaft) of the electrical machine. The fly-wheel 2 carries slidably one component 4 of a connecting gear or clutch. The rotor of a D. C. dynamo 5 is attached to the shaft 3 and is connected electrically by conducting wires 6 to a starter 7 through a switch 8 which closes automatically as soon as a current failure occurs. The starter 7 drives a pinion 9 engaging a toothed wheel 10 carrying the second component 11 of the connecting gear or clutch which is rigidly connecting with the crank-shaft 12 (termed hereinafter the second shaft) of a stand-by heat engine 13. An auxiliary motor or an electromagnet shown diagrammatically at 14 and energized preferably by a time delayed means such as a time-switch 15, enables the two components 4 and 11 of the connecting gear or clutch to be connected with each other.

The operation of this device is as follows:

In normal running, the electrical motor 1 fed by the supply S causes the working of the parts of the plant and the shaft 3 thereof rotates the fly-wheel 2 and the rotor of the direct current dynamo 5. If the current fails, the rotor of the electrical machine 1 continues to rotate under the action of the kinetic energy of the fly-wheel 2 and to feed the plant. The switch 8 closes automatically and causes the current from the dynamo 5 to feed the starter 7. At this instant, the pinion 9 drives the toothed wheel 10, and causes the second component of the connecting gear or clutch to rotate the crank-shaft 12, which initiates the starting of the engine 13. The starting takes place more or less quickly without incurring a danger of breaking of any of the parts of the engine 13. When the starting has sufficiently advanced, the time switch 15, through the auxiliary motor or electro-magnet 14, controls the slidable portion 4 of the connecting gear or clutch which comes gently into engagement with the other component 11. The fly-wheel 2 continues to rotate and drives through the engaged clutch connection 4—11 the crank-shaft 12 and the engine 13 with a smooth and gradual increase in speed. The engine 13, therefore, reaches its normal speed almost instantaneously without any substantial drop in the currents produced by the electrical machine 1 and the dynamo 5, since the engine 13 adds to the increasing speed thereof that of the fly-wheel 2. From that time onwards, the shaft 12 of the engine 13, through the clutch 11—4 brings the shaft 3, almost at once, to rotate at its normal rate so that the plant is supplied with its usual current as long as the current failure lasts. When the line is normal again after the failure, the arrangement automatically ceases acting and the whole assembly is then in the same condition as before the occurrence of the current failure.

This arrangement has the following advantages:

(I) As soon as a failure is noticed, the electrical machine continues to feed the plant. Simultaneously, the stand-by engine is gradually set to motion smoothly.

(II) With the engine gradually put into motion, there is no danger of breaking; consequently there is no need of any strengthening of parts as with arrangemnts providing a sudden engagement of the clutching means.

(III) The gradual and smooth putting into motion of the engine enables starting without any danger of breaking, even if the temperature is below freezing point; so that preheating of any parts is unnecessary.

(IV) The fly-wheel does not ensure the starting of the engine automatically and at once; from the moment of the warning of a current failure, the electrical machine 5 becomes a current generator and feeds the plant through the kinetic energy of the fly-wheel.

(V) With the arrangement according to the invention, three factors come into play at the time of the start of a failure so as to avoid any cessation of feed for a single moment however short. First the kinetic energy of the fly-wheel acts so as to keep the rotor of the electrical machine rotating which becomes a generator; second, since the electrical machine does not stop rotating it remains energized. Third when the engine is started and connected automatically with the shaft of the electrical machine, the latter ensures the feeding of the plant in lieu of the mains.

Figure 2:
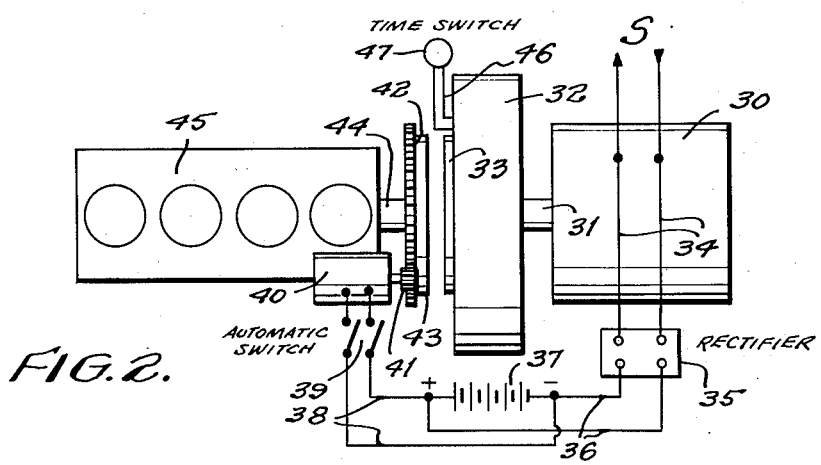
Fig. 2 is a plan view of a second embodiment of the present invention.

Fig. 2 shows an electrical machine 30 fed from a supply S. To the shaft 31 thereof is attached a fly-wheel 32 provided with one component 33 of a clutch. Conductors 34 connect the supply S with a rectifier 35 from which conductors 36 lead to a set of storage cells 37. Further conducting wires 38 lead through an automatic switch 39 to a starter 40 which actuates a pinion 41 acting on a toothed wheel 42 carrying the other clutch component 43 which is connected rigidly with the crank-shaft 44 of a stand-by engine 45. An auxiliary motor or an electromagnet and controlled preferably by a time-switch 47, enables the two components 33 and 43 of the clutch to be connected with each other.

The operation of this device is as follows:

On normal running, the shaft 31 rotates the fly-wheel 32 and the conductors 34 lead a current to the rectifier 35 which is rectified, and used for charging the battery 37. When the same is fully charged, the rectifier is switched off and the battery is in readiness for a current failure. If this occurs, the fly-wheel 32 takes over the moving of the rotor of the machine 30 which continues to feed the plant, without any break. The switch 39 closes automatically and the battery 37 actuates the starter 40. The pinion 41 causes the wheel 42 to rotate and the component 43 of the connecting gear drives the crank-shaft 44 effecting a slow starting of the engine 45. As soon as the parts of the engine are properly in motion, the time switch 47 brings the clutch components 33—43 into engagement. The fly-wheel 32 drives the engine 45 through the coupling 33—43 and the crank-shaft 44 and the result previously explained is obtained.

Figure 3:
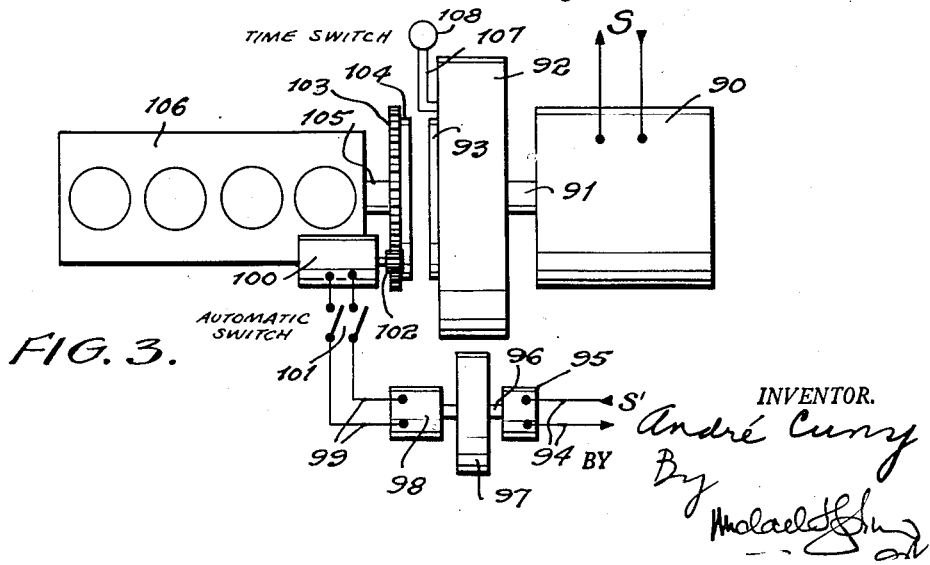
Fig. 3 is a plan view of a third embodiment of the present invention.

Fig. 3 illustrates a machine 90 which is fed from the supply S. To the shaft 91 is attached a fly-wheel 92 provided with one component 93 of a clutch. Conductors 94 connect a further supply S' to an auxiliary motor 95. To the shaft 96 thereof (termed hereinafter the third shaft) is keyed a fly-wheel 97 and the rotor of a direct current dynamo 98 which is connected by wires 999 to a starter 100 through a switch 101. The starter 100 drives a pinion 102 meshing with a toothed wheel 103 carrying the other component 104 of the clutch. The component 104 is connected rigidly with the crankshaft 105 of a stand-by engine 106. An auxiliary motor or an electromagnet 107 controlled preferably by a time switch 108 enables the components 93—104 to be coupled with each other.

The operation of this device is as follows:

In normal running, the current coming from the supply S causes the rotation of the shaft 91 driving the fly-wheel 92. Furthermore the supply S' starts the auxiliary motor 95 the shaft 96 of which drives the fly-wheel 97 and the direct current dynamo 98. In the event of a failure of current the fly-wheel 92 makes the rotor of the generator 90 revolve which provides current for feeding the plant. Furthermore the fly-wheel 97 drives the rotor of the dynamo 98, the switch 101 closes automatically and the starter 100 engages the pinion 102 with the wheel 103. The clutch component 104 rotates the crank-shaft 105 which effects the more or less slow starting of the engine 106 and a result is obtained as explained previously.

Figure 4:
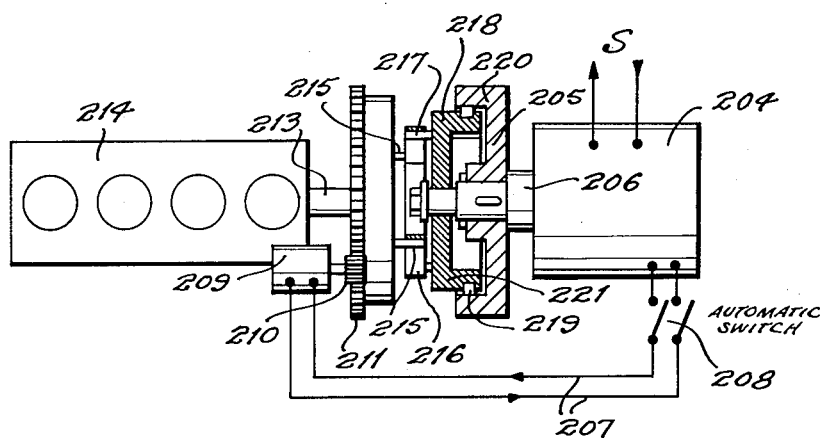
Fig. 4 is a plan view of a fourth embodiment of the present invention.

Fig. 4 shows a reversible generator 204 fed by an electric supply S and provided with a fly-wheel 205 fixed on the shaft 206 of said generator 204. The fly-wheel 205 forms the female portion of a free wheel. Conducting wires 207 connect the generator 204, through a switch 208 to a starter 209 actuating a toothed pinion 210 and bring the same to engagement with a toothed wheel 211 provided with a fly-wheel 212 connected rigidly with the crank-shaft 213 of a stand-by engine 214. The fly-wheel 212 is provided with pins 215 which drive the pins 217 of the male portion 218 of the free wheel by means of a flexible member, for instance a belt 216. Rollers 219 are arranged between toothed wheels 220 and 221 forming respectively the female portion 205 and the male portion 218 of the free wheel.

The operation of this device is as follows:

In the event of failure of the current supply S the rotor of the generator 204 continues to rotate under the action of the kinetic energy of the fly-wheel 205 and generates current which feeds the plant without any break and which actuates the starter 209 through the conducting wires 207 and the switch 208. Gradually the pinion 210 drives the toothed wheel 211 and the fly-wheel 212 which drives the crank-shaft 213 which starts the engine 214 more or less slowly. As soon as the engine 214 is put in motion, the male portion 218 revolves under no load conditions, through the transmission member 216 until the speed of the engine 214 corresponds to that of the rotor of the generator 204. At this time, the rollers 219 connect the male portion 218 rigidly with the female portion and drive the shaft 206. The engine 214 reaches its normal speed almost at once. The crank-shaft 213 arrives immediately through the male portion 218 and female portion 205, at rotating the shaft 206 at its normal rate of speed which provides the plant with normal current until the cause of the failure is corrected. At this instant, the stand-by engine 214 comes automatically into play.

Figure 5:
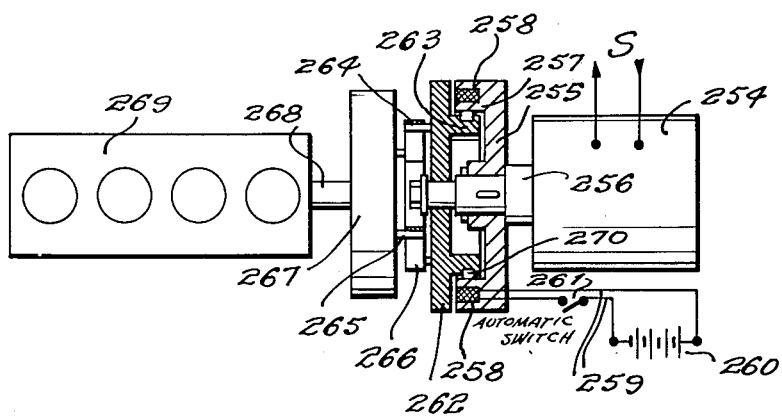
Fig. 5 is a plan view of a fifth embodiment of the present invention.

Fig. 5 shows a reversible generator 254 fed by an electric supply S and provided with a first fly-wheel 255 attached to the shaft 256 of the generator. The fly-wheel 255 forms the female portion of a free wheel which is provided with a rim portion 257 in which is housed the winding 258 of an electro-magnet connected by contact brushes (not shown) and by conducting wires 259 to a set of storage cells 260. The conducting wires 259 carry a switch 261. The male portion 262 of this free wheel is provided with a rim portion 263, provided with first pins 264. A second fly-wheel 267 is provided with second pins 265 which, by means of a flexible part, for instance a belt 266, make the male part 262 rigid with the second fly-wheel 267. The second fly-wheel 267 is connected rigidly with the crank-shaft 268 of a stand-by engine 269. Rollers 270 are arranged between the rim portions 257 and 263, respectively, of the female portion 255 and the male portion 262.

The operation of this device is as follows:

At the time of a current failure, the rotor of the generator 254 continues to rotate under the action of the kinetic energy of the fly-wheel 255, and feeds the plant. At this instant, the set of storage cells 260 is connected into the circuit by means of the switch 259 and feeds the winding 258, thus setting up a magnetic field of sufficient strength to pull the male portion 262 and to press the same against the female portion 255 of the free wheel, thus forming a sliding clutch sufficient for starting the stand-by engine 269. Through the pins 264 and 265, the crank-shaft 268 is put in motion and initiates gradually the starting of the engine 269. As soon as the starting of the engine 269 takes place, the magnetic field is no longer required and the current feeding the winding 258 is cut off. The male portion 262 of the free wheel turns idle until the speed of the crank-shaft 268 which is increasing continually corresponds to that of the shaft 256. At this instant the rollers 270 make the rim 263 rigid with the rim 257, and the generator 254, which now operates as a dynamo, provides the current required for feeding the plant until the current failure no longer exists. At the time of the restoration of the current of the supply S, the stand-by engine slows down the speed thereof by means (not shown), the rollers 270 adhere no longer to the rim portion 257; and the male portion 262 drives no longer the female portion 255, so that the assembly is in the same condition as before the current failure occurred and is ready to operate at once again in the event of a fresh failure of the supply S.

This system of starting through a sliding clutch gives great flexibility in starting the stand-by engine and avoids any sudden starting of the engine parts.

This free wheel coupling which is only performed when the crank-shaft 268 and the crank-shaft 256 rotate at substantially equal speeds suppresses not only shocks but also avoids wear due to friction arising from the relative slipping of the clutch components.

With this system if, for any reason or other, the engine cannot start, no breaking of any part will occur.

What I claim is:

1. An electric generating set comprising in combination, electric mains connected to a current supply; an electric machine having a first shaft, said electric machine being connected to said electric mains and being adapted to operate as a generator for supplying current into said electric mains upon a failure of the current supply to said electric mains; a flywheel connected to said first shaft and adapted to drive said first shaft when said machine operates as a generator; a stand-by engine having a second shaft; and means for connecting said second shaft and said flywheel when said second shaft and said flywheel rotate at substantially equal speeds.

2. An electric generating set comprising in combination, electric mains connected to a current supply; an electric machine having a first shaft, said electric machine being connected to said electric mains and being adapted to operate as a generator for supplying current into said electric mains upon a failure of the current supply to said electric mains; a flywheel connected to said first shaft and adapted to drive said first shaft when said machine operates as a generator; a stand-by engine having a second shaft; means for starting said stand-by engine upon a failure of current in said electric mains; and means for connecting said second shaft and said flywheel when said second shaft and said flywheel rotate at substantially equal speeds.

3. An electric generating set comprising in combination, electric mains connected to a current supply; an electric machine having a first shaft, said electric machine being connected to said electric mains and being adapted to operate as a generator for supplying current into said electric mains upon a failure of the current supply to said electric mains; a high inertia flywheel connected to said first shaft and adapted to drive said first shaft when said machine operates as a generator; a stand-by engine having a second shaft; means for starting said stand-by engine upon a failure of current in said electric mains; a clutch arranged between said second shaft and said flywheel; and means for engaging said clutch when said second shaft and said flywheel rotate at substantially equal speeds.

4. An electric generating set comprising in combination, electric mains connected to a current supply; an electric machine having a first shaft, said electric machine being connected to said electric mains and being adapted to operate as a generator for supplying current into said electric mains upon a failure of the current supply to said electric mains; a high inertia flywheel connected to said first shaft and adapted to drive said first shaft when said machine operates as a generator; a stand-by engine having a second shaft; means for starting said stand-by engine upon a failure of current in said electric mains; a clutch arranged between said second shaft and said flywheel; and time delayed means for engaging said clutch causing said clutch to become operative when said second shaft has acquired a speed substantially equal to the speed of said flywheel.

5. An electric generating set comprising in combination, electric mains connected to a current supply; an electric machine having a first shaft, said electric machine being connected to said electric mains and being adapted to operate as an electric motor when said electric mains carry their normal current and as a generator for supplying current into said electric mains upon a failure of the current supply to said electric mains; a high inertia flywheel connected to said first shaft and adapted to drive said first shaft when said machine operates as a generator; a stand-by engine having a second shaft; means for starting said stand-by engine upon a failure of current in said electric mains; a clutch arranged between said second shaft and said flywheel; and means for engaging said clutch when said second shaft and said flywheel rotate at substantially equal speeds.

6. An electric generating set comprising in combination, electric mains connected to a current supply; a synchronous synchronized alternator machine having a first shaft, said electric machine being connected to said electric mains and being adapted to operate as an electric motor when said electric mains carry their normal current and as a generator for supplying current into said electric mains upon a failure of the current supply to said electric mains; a high inertia flywheel connected to said first shaft and adapted to drive said first shaft when said machine operates as a generator; a stand-by engine having a second shaft; means for starting said stand-by engine upon a failure of current in said electric mains; a clutch arranged between said second shaft and said flywheel; and means for engaging said clutch when said second shaft and said flywheel rotate at substantially equal speeds.

7. An electric generating set comprising in combination, electric mains connected to a current supply; an electric machine having a first shaft, said electric machine being connected to said electric mains and being adapted to operate as an electric motor when said electric mains carry their normal current and as a generator for supplying current into said electric mains upon a failure of the current supply to said electric mains; a flywheel connected to said first shaft and adapted to drive said first shaft when said machine operates as a generator; a stand-by engine having a second shaft; a clutch arranged between said second shaft and said flywheel; means for engaging said clutch when said second shaft and said flywheel rotate at substantially equal speeds; a direct current generator arranged on said first shaft; electrically driven means for starting said stand-by engine; connections between said direct current generator and said electrically driven means; and a switch inserted in said connections and adapted to close upon a failure of the current supply to said electric mains.

8. An electric generating set comprising in combination, electric mains connected to a current supply; an electric machine having a first shaft, said electric machine being connected to said electric mains and being adapted to operate as an electric motor when said electric mains carry their normal current and as a generator for supplying current into said electric mains upon a failure of the current supply to said electric mains; a flywheel connected to said first shaft and adapted to drive said first shaft when said machine operates as a generator; a stand-by engine having a second shaft; a clutch arranged between said second shaft and said flywheel; time delay means for engaging said clutch causing said clutch to become operative when said second shaft has acquired a speed substantially equal to the speed of said flywheel; a direct current generator arranged on said first shaft; electrically driven means for starting said stand-by engine; connections between said direct current generator and said electrically driven means; and a switch inserted in said connections and adapted to close upon a failure of the current supply to said electric mains.

9. An electric generating set comprising in combination, electric mains connected to a current supply; an electric machine having a first shaft, said electric machine being connected to said electric mains and being adapted to operate as an electric motor when said electric mains carry their normal current and as a generator for supplying current into said electric mains upon a failure of the current supply to said electric mains; a flywheel connected to said first shaft and adapted to drive said first shaft when said machine operates as a generator; a stand-by engine having a second shaft; a clutch arranged between said second shaft and said flywheel; means for engaging said clutch when said second shaft and said flywheel rotate at substantially equal speeds; a rectifier having an input connected to said electric mains; a battery connected to the output of said rectifier; electrically driven means for starting said stand-by engine; connections between said battery and said electrically driven means; and a switch inserted in said connections and adapted to close upon a failure of the current supply to said electric mains.

10. An electric generating set comprising in combination, electric mains connected to a current supply; an electric machine having a first shaft, said electric machine being connected to said electric mains and being adapted to operate as an electric motor when said electric mains carry their normal current and as a generator for supplying current into said electric mains upon a failure of the current supply to said electric mains; a flywheel connected to said first shaft and adapted to drive said first shaft when said machine operates as a generator; a stand-by engine having a second shaft; a clutch arranged between said second shaft and said flywheel; time delay means for engaging said clutch causing said clutch to become operative when said second shaft has acquired a speed substantially equal to the speed of said flywheel; a rectifier having an input connected to said electric mains; a battery connected to the output of said rectifier; electrically driven means for starting said stand-by engine; connections between said battery and said electrically driven means; and a switch inserted in said connections and adapted to close upon a failure of the current supply to said electric mains.

11. An electric generating set comprising in combination, electric mains connected to a current supply; an electric machine having a first shaft, said electric machine being adapted to operate as a generator; a flywheel connected to said first shaft and adapted to drive said first shaft when said machine operates as a generator; a stand-by engine having a second shaft; a clutch arranged between said second shaft and said flywheel; means for engaging said clutch when said second shaft and said flywheel rotate at substantially equal speeds; an auxiliary motor having a third shaft, said auxiliary motor being connected to said electric means; means rigidly secured to said third shaft and adapted to supply energy to said third shaft stored while said electric mains receive current from the current supply; a direct current generator driven by said third shaft; electrically driven means for starting said stand-by engine; connections between said direct current generator and said electrically driven means; and a switch inserted in said connections and adapted to close upon a failure of the current supply to said electric mains.

12. An electric generating set comprising in combination, electric mains connected to a current supply; an electric machine having a first shaft, said electric machine being adapted to operate as a generator; a flywheel connected to said first shaft and adapted to drive said first shaft when said machine operates as a generator; a stand-by engine having a second shaft; a clutch arranged between said second shaft and said flywheel; time delay means for engaging said clutch causing said clutch to become operative when said second shaft has acquired a speed substantially equal to the speed of said flywheel; an auxiliary motor having a third shaft, said auxiliary motor being connected to said electric means; means rigidly secured to said third shaft and adapted to supply energy to said third shaft stored while said electric mains receive current from the current supply; a direct current generator driven by said third shaft; electrically driven means for starting said stand-by engine; connections between said direct current generator and said electrically driven means; and a switch inserted in said connections and adapted to close upon a failure of the current supply to said electric mains.

13. An electric generating set comprising in combination, electric mains connected to a current supply; an electric machine having a first shaft, said electric machine being connected to said electric mains and being adapted to operate as an electric motor when said electric mains carry their normal current and as a generator for supplying current into said electric mains upon a failure of the current supply to said electric mains; a first flywheel connected to said first shaft and adapted to drive said first shaft when said machine operates as a generator; a stand-by engine having a second shaft; electrically driven means for starting said stand-by engine; electrical connections between said electrically driven means and said electric machine; a switch inserted in said connections and adapted to close upon a failure of the current supply to said electric mains; a free-wheel mechanism connecting said electric machine and said stand-by engine; a rim portion connected to said first flywheel and forming the driven part of said free-wheel mechanism; a second flywheel connected to said second shaft; a driving part of said free-wheel mechanism; rollers arranged between said driving part and said driven part of said free-wheel mechanism; a plurality of first pins connected to said second flywheel; a plurality of second pins rigidly connected to said driving part of said free-wheel mechanism; and a flexible connection between said first pins and said second pins adapted to transmit the motion of said second flywheel to said driving part of said free-wheel mechanism.

14. An electric generating set comprising in combination, electric mains connected to a current supply; an electric machine having a first shaft, said electric machine being connected to said electric mains and being adapted to operate as an electric motor when said electric mains carry their normal current and as a generator for supplying current into said electric mains upon a failure of the current supply to said electric mains; a first flywheel connected to said first shaft and adapted to drive said first shaft when said machine operates as a generator; a stand-by engine having a second shaft; a free-wheel mechanism connecting said electric machine and said stand-by engine; a rim portion connected to said first flywheel and forming the driven part of said free-wheel mechanism; a second flywheel connected to said second shaft; a driving part of said free-wheel mechanism; rollers arranged between said driving part and said driven part of said free-wheel mechanism; a plurality of first pins connected to said second flywheel; a plurality of second pins rigidly connected to said driving part of said free-wheel mechanism; a flexible connection between said first pins and said second pins adapted to transmit the motion of said second flywheel to said driving part of said free-wheel mechanism; a plurality of windings of electromagnets arranged in said rim portion of said first flywheel and cooperating with said driving part of said free-wheel mechanism; a battery feeding said windings; and a switch inserted between said battery and said windings.

ANDRÉ CUNY.

REFERENCES CITED

The following references are of record in the file of this patent:

UNITED STATES PATENTS

| Number | Name | Date |
|---|---|---|
| 674,825 | De Castro | May 21, 1901 |
| 912,074 | Clark | Feb. 9, 1909 |
| 996,334 | Haskins | June 27, 1911 |
| 1,079,259 | Nehlsen | Nov. 18, 1913 |
| 1,329,276 | Sprong | Jan. 27, 1920 |
| 1,362,588 | Allen et al. | Dec. 21, 1920 |
| 1,566,936 | Trombetta | Dec. 22, 1925 |
| 1,580,392 | Wensley | Apr. 13, 1926 |
| 1,662,366 | Cosgray | Mar. 13, 1928 |
| 1,703,064 | Griffiths | Feb. 19, 1929 |
| 1,957,016 | Loudon | May 1, 1934 |
| 1,989,481 | Kerr | Jan. 29, 1935 |
| 1,998,655 | Bryan | Apr. 23, 1935 |
| 2,024,531 | Lyons | Dec. 17, 1935 |
| 2,070,615 | Plante | Feb. 16, 1937 |
| 2,476,086 | Porey | July 12, 1949 |

FOREIGN PATENTS

| Number | Country | Date |
|---|---|---|
| 755,321 | France | Sept. 4, 1933 |
| 567,904 | Germany | Jan. 11, 1933 |